United States Patent
Chung et al.

(10) Patent No.: US 8,036,103 B2
(45) Date of Patent: Oct. 11, 2011

(54) PORTABLE INTERNET RADIO ACCESS STATION INCLUDING MULTIPLE MANAGEMENT PROCESSORS AND METHOD OF CONTROLLING THE MULTIPLE MANAGEMENT PROCESSORS

(75) Inventors: Jun-Ho Chung, Gyeonggi-do (KR); Sung-Soo Oh, Gyeonggi-do (KR); Shin-Ha Kang, Gyeonggi-do (KR); Jung-Sik Choi, Gyeonggi-do (KR)

(73) Assignee: SeAH Networks Co., Ltd., Seoul (KR)

( * ) Notice: Subject to any disclaimer, the term of this patent is extended or adjusted under 35 U.S.C. 154(b) by 497 days.

(21) Appl. No.: 12/300,041

(22) PCT Filed: May 23, 2007

(86) PCT No.: PCT/KR2007/002489
§ 371 (c)(1),
(2), (4) Date: Nov. 7, 2008

(87) PCT Pub. No.: WO2007/139303
PCT Pub. Date: Dec. 6, 2007

(65) Prior Publication Data
US 2009/0154435 A1    Jun. 18, 2009

(30) Foreign Application Priority Data
May 25, 2006    (KR) .................. 10-2006-0047017

(51) Int. Cl.
*G01R 31/08* (2006.01)
*H04L 12/66* (2006.01)
*H04J 3/12* (2006.01)
(52) U.S. Cl. .................. 370/216; 370/352; 370/522
(58) Field of Classification Search .................. None
See application file for complete search history.

(56) References Cited

U.S. PATENT DOCUMENTS

| 5,056,086 | A | * | 10/1991 | Libonati | 370/259 |
| H1859 | H | * | 9/2000 | Asthana et al. | 370/217 |
| 2002/0112123 | A1 | * | 8/2002 | Becker et al. | 711/122 |
| 2007/0127442 | A1 | * | 6/2007 | O'Neil et al. | 370/352 |

FOREIGN PATENT DOCUMENTS

| KR | 2002-0045275 A | 6/2002 |
| KR | 2003-0050879 A | 6/2003 |
| KR | 2004-0054974 A | 6/2004 |

OTHER PUBLICATIONS

Corresponding Search Report of PCT/KR/2007/002489 issued Aug. 24, 2007.

* cited by examiner

*Primary Examiner* — Nittaya Juntima
(74) *Attorney, Agent, or Firm* — Duane Morris LLP

(57) ABSTRACT

The present invention relates to a portable internet radio access station, and more particularly, to a portable internet radio access station including a plurality of management processors and a method of controlling the plurality of management processors. A first management processor of a portable internet radio access station according to the present invention includes: an obstruction sensing unit sensing an obstruction in the first and second management processors; a call processing database storing a call processing information of the portable internet radio access station; an operation state determining unit determining an operation state of the first management processor based on the obstruction; and a database synchronizing unit synchronizing the call processing database with a call processing database of the second management processor based on the operation state of the first management processor Accordingly, continuity and reliability in call processing are obtained in the portable internet radio access station of the present invention.

36 Claims, 6 Drawing Sheets

[Fig. 3]
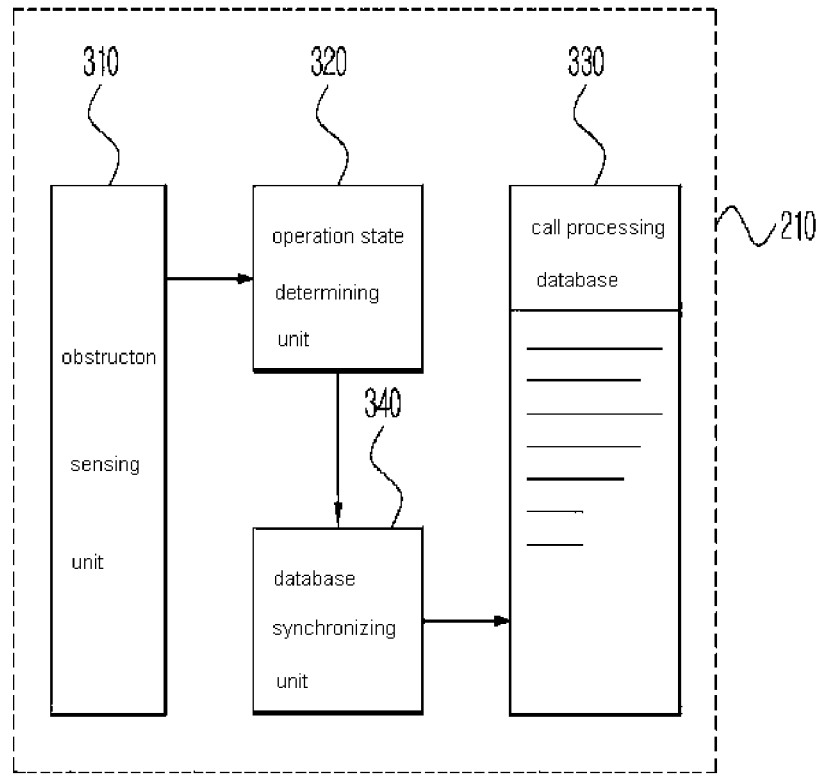
[Fig. 4]
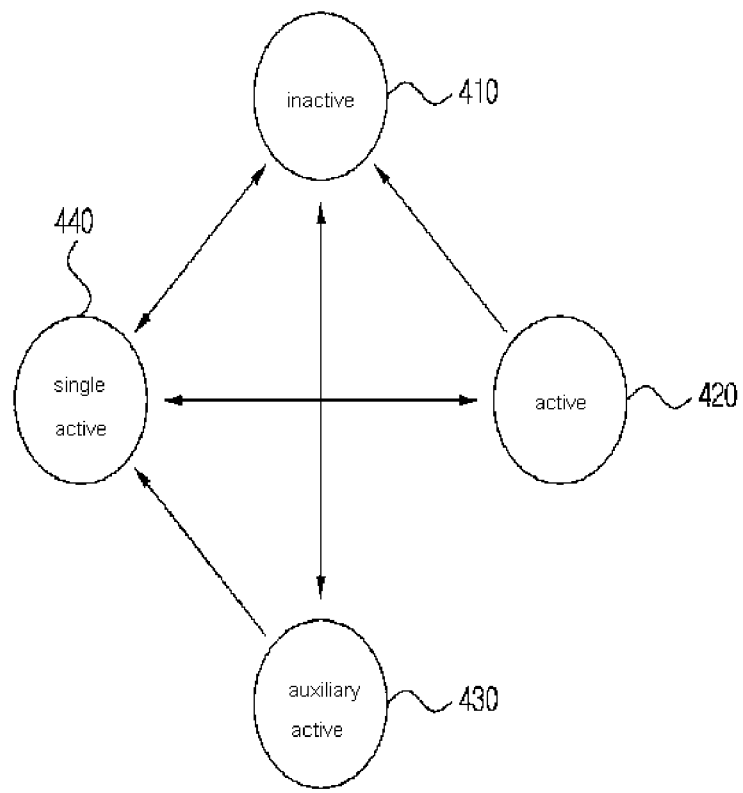

[Fig. 5]
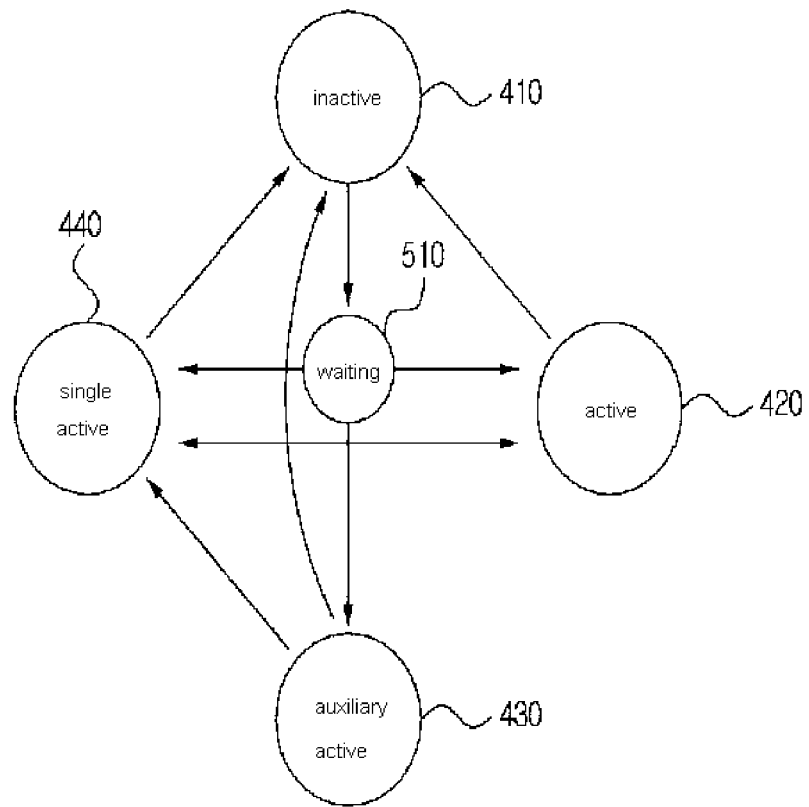
[Fig. 6]
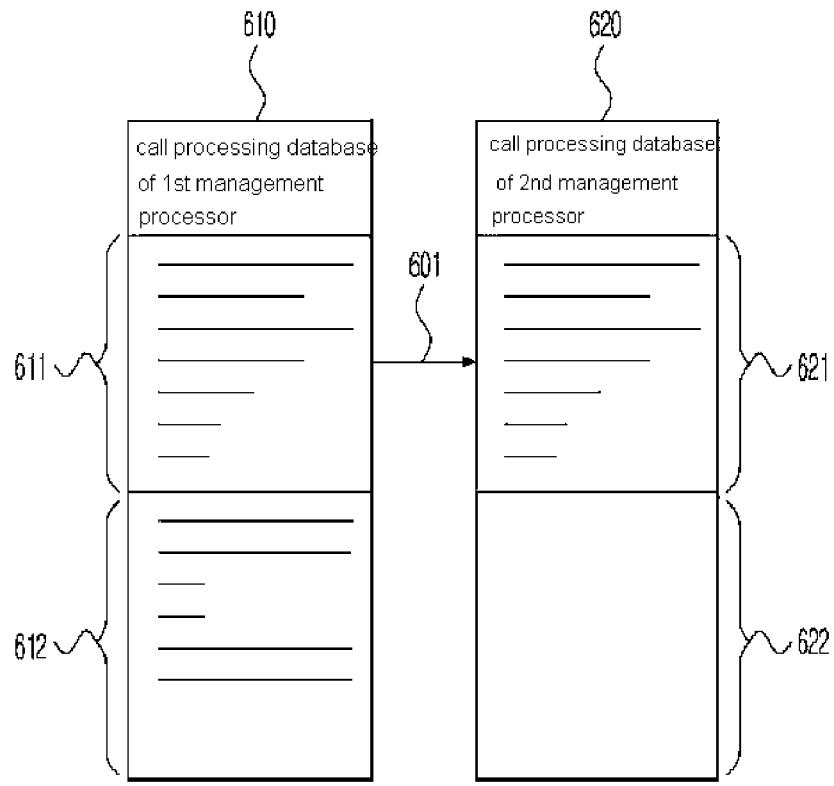

[Fig. 7]
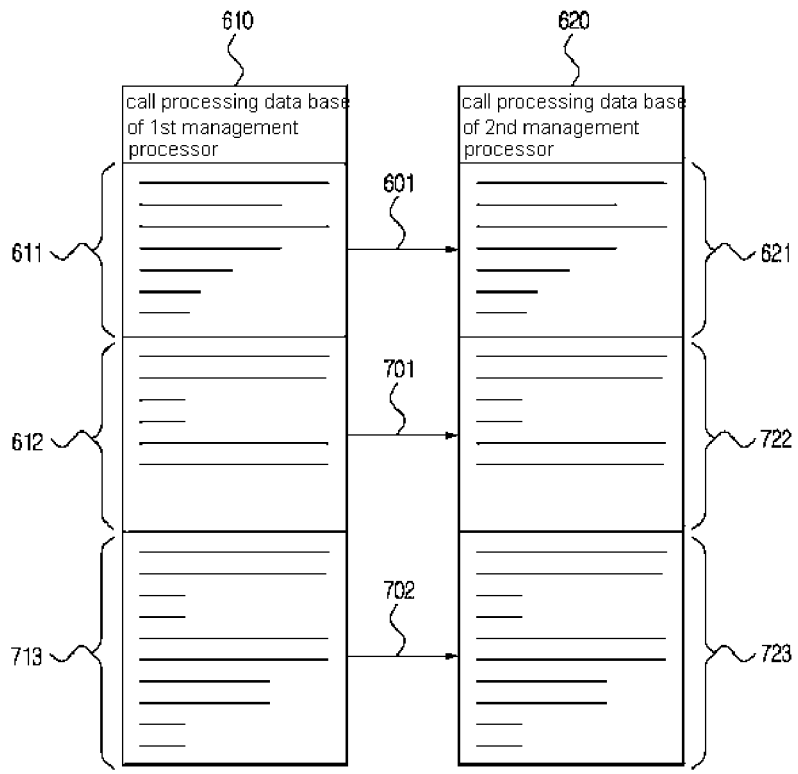
[Fig. 8]
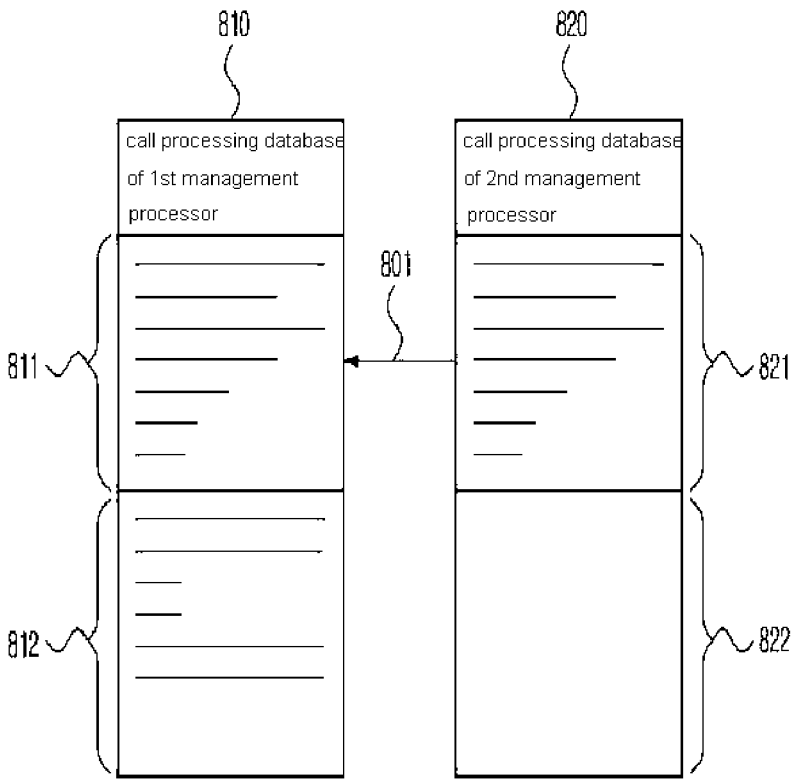

[Fig. 9]
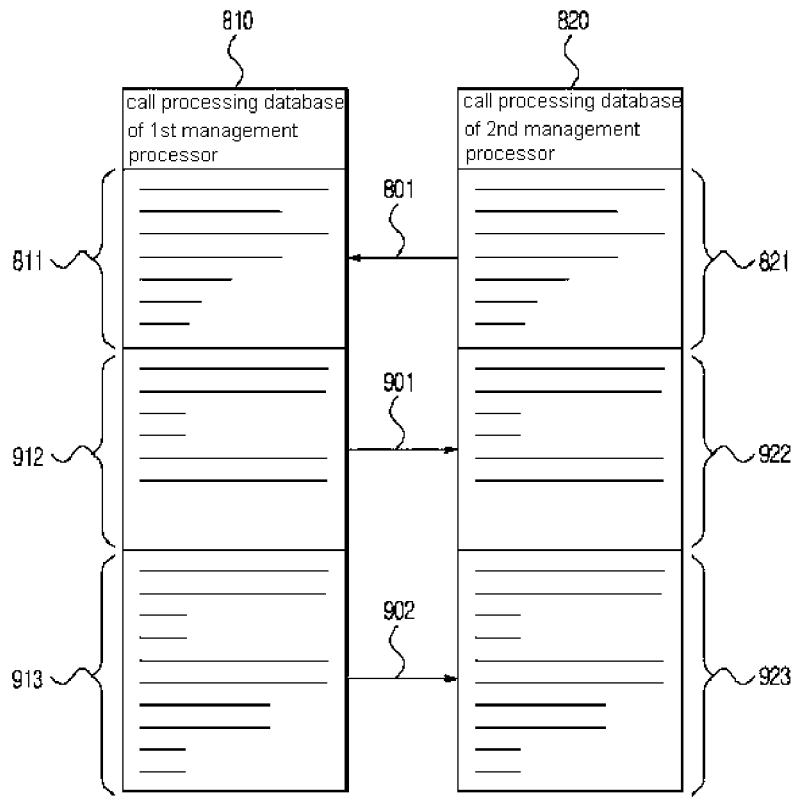
[Fig. 10]
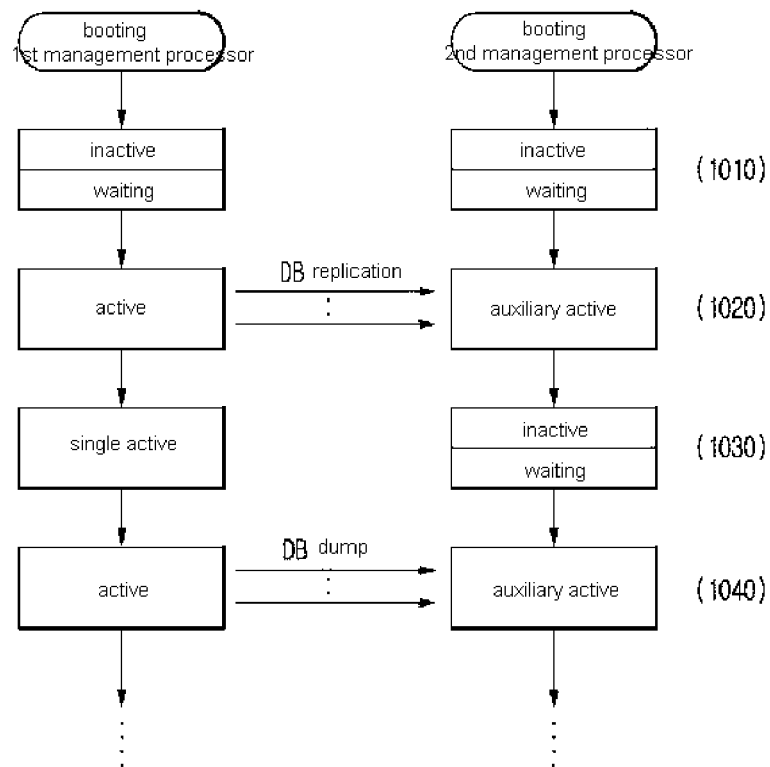

[Fig. 11]
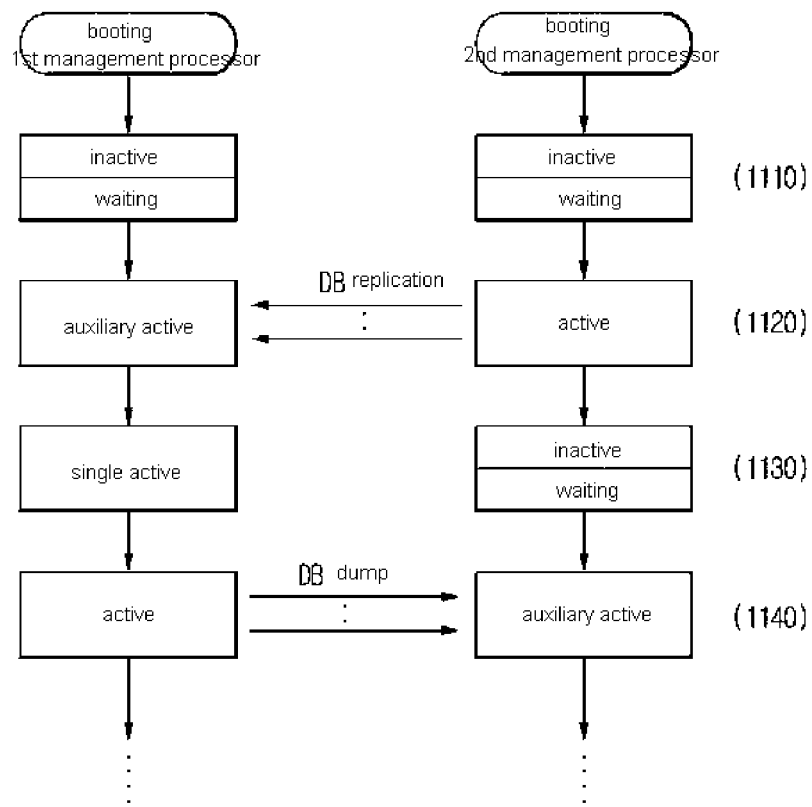
[Fig. 12]
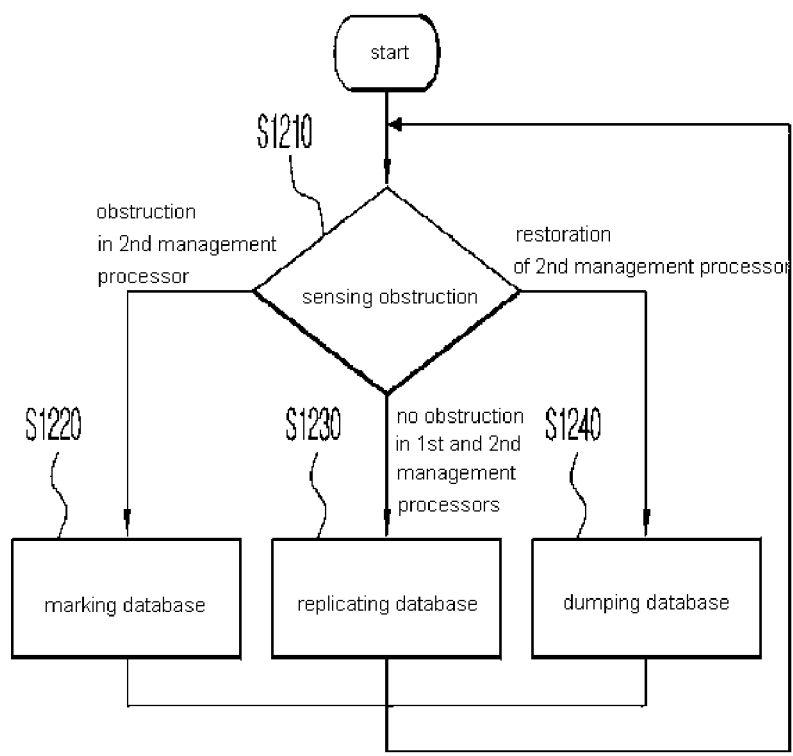

PORTABLE INTERNET RADIO ACCESS STATION INCLUDING MULTIPLE MANAGEMENT PROCESSORS AND METHOD OF CONTROLLING THE MULTIPLE MANAGEMENT PROCESSORS

TECHNICAL FIELD

The present invention relates to a portable internet radio access station, and more particularly, to a portable internet radio access station including a plurality of management processors for performing a call processing in a portable internet service and a method of controlling the plurality of management processors.

BACKGROUND ART

A portable internet service (PIS), which is referred to as a 3.5-generation mobile communication, is a next generation wireless data communication service that combines advantages of a wireless internet service (3-generation mobile communication) based on a W-CDMA (wideband-code division multiple access) and a CDMA and advantages of a ultra high speed internet service through a wire net.

Differently from a conventional wireless internet service, a portable internet service of an orthogonal frequency division multiple access (OFDMA) type uses a transmission band of total 100 MHz among a frequency band of 1.9 GHz to 3.0 GHz and a data over 1 Mbps is transmitted even when a user moves with a high speed, for example, 60 km/h.) Accordingly, a portable internet service can satisfy user's requests for high mobility and high speed. In addition, a real-time multimedia data transmission and a simultaneous diverse service are provided to cause a ripple effect to information and communication industries.

FIG. 1 is a schematic view showing a portable internet network of the related art. As shown in FIG. 1, a portable internet network includes a portable subscriber station (PSS) 140, a radio access station (RAS) 130 connected to the PSS 140 through a wireless channel and an access control router (ACR) 120 controlling operation of the RAS 130 and connecting the RAS 130 and an edge router of a subscriber network 110.

The portable internet network provides a portable internet service to the PSS 140 by processing a call connection, a certification and a handover in response to a call from the PSS 140. All or a portion of the call processing may be performed in the RAS 130.

FIG. 2 is a block diagram showing an inner structure of a radio access station of the related art. In FIG. 2, a radio access station (RAS) 130 is connected to an access control router (ACR) 120, and includes a management processor 210 and a plurality of channel cards 220. The management processor 210 controls the call processing of the portable internet and manages all units in the RAS 130, and the plurality of channel cards 220 are provided for securing a wireless communication channel with the PSS 140 (of FIG. 1)

DISCLOSURE OF INVENTION

Technical Problem

The management processor 210 for managing the call processing and managing inner units of the RAS 130 may meet with diverse obstructions. For example, when obstructions in an operation of the management processor 210 temporarily occurs due to a system defect or an overload of a network, the call processing is not continuously provided until the management processor 210 is restored. As a result, a continuity of the portable internet service relating to the call processing is restricted.

Specifically, when a continuity of a portable internet service that should be provided in real-time is restricted due to obstructions, a reliability of the portable internet service is reduced.

Therefore, means for securing the continuity and the reliability of a portable internet service against the obstructions in the management processor 210 have been required.

To solve the above problems, the present invention provides a new technology relating to a portable internet radio access station controlling a procedure of portable internet call processing using a plurality of management processors.

Technical Solution

Accordingly, embodiments of the invention is directed to a portable internet radio access station including a plurality of management processors, and a method of controlling the plurality of management processors that substantially obviate one or more of the problems due to limitations and disadvantages of the related art are described.

An object of the embodiments of the invention is to provide a portable internet radio access station that secures stability and reliability of the call processing therein.

Another object of the embodiments of the invention is to provide a portable internet radio access station where a continuity of the call processing is secured by controlling the call processing using a plurality of management processors whose operation states are determined according to generation of obstructions even when the obstructions occur.

Another object of the embodiments of the invention is to provide a portable internet radio access station where call processing databases in a plurality of management processors are synchronized with one another by continuously duplicating update information of the call processing databases when the plurality of management processors operate without obstructions.

Another object of the embodiments of the invention is to provide a portable internet radio access station where call processing databases are effectively synchronized by marking the call processing information at the time of obstruction generation or the newly updated the call processing information when the obstructions occur in a management processor and by dumping the marked call processing information when the management processor is restored.

Another object of the embodiments of the invention is to provide a portable internet radio access station where operation states of a plurality of management processors are organically changed by determining the operation state of each management processor based on generation of obstructions.

Another object of the embodiments of the invention is to provide a portable internet radio access station where a hardware and a software of a obstruction sensing unit are simplified and delay of sensing obstructions is minimized by sensing the obstructions based on a hardware interrupt.

Another object of the embodiments of the invention is to provide a portable internet radio access station where an obstruction occurred in a management processor does not affect the other management processor and a solving capability against obstructions is improved by dividing source powers applied to a plurality of management processors or hardware and software structures of the plurality of management processors.

Another object of the embodiments of the invention is to provide a portable radio access station where multiplexing of calls and call resources is provided by synchronizing databases of a plurality of management processors while a portable subscriber station is connected to a radio access station or while a portable internet service is provided to a portable subscriber station.

To achieve these and other advantages and in accordance with the purpose of embodiments of the invention, as embodied and broadly described, a portable internet radio access station includes a plurality of management processors, wherein a first management processor of the plurality of management processors includes: an obstruction sensing unit sensing an obstruction in the first and second management processors; a call processing database storing a call processing information of the portable internet radio access station; an operation state determining unit determining an operation state of the first management processor based on the obstruction; and a database synchronizing unit synchronizing the call processing database with a call processing database of the second management processor based on the operation state of the first management processor.

In another aspect, a method of controlling a plurality of management processors of a portable internet radio access station includes: sensing an obstruction in first and second management processors of the plurality of management processors; marking a call processing information relating to the first management processor when the obstruction is sensed in the second management processor; and dumping the marked call processing information from the first management processor to the second management processor when the second management processor is restored from the obstruction.

Advantageous Effects

In a portable internet radio access station according to the present invention, continuity, reliability and stability of a call processing are improved by synchronizing a plurality of management processors.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings:

FIG. 3 is a block diagram showing an inner structure of a management processor in a portable internet radio access station according to an embodiment of the present invention;

FIG. 4 is a schematic view showing operation states and a state transition among the operation states of a management processor in a portable internet radio access station according to an embodiment of the present invention;

FIG. 5 is a schematic view showing operation states and a state transition among the operation states of a management processor in a portable internet radio access station according to another embodiment of the present invention;

FIGS. 6 and 7 are schematic views showing operations of call processing databases of a plurality of management processors in a portable internet radio access station according to an embodiment of the present invention;

FIGS. 8 and 9 are schematic views showing operations of call processing databases of a plurality of management processors in a portable internet radio access station according to another embodiment of the present invention;

FIG. 10 is a view showing operation states of a plurality of management processors of a portable internet radio access station according to an embodiment of the present invention;

FIG. 11 is a view showing operation states of a plurality of management processors of a portable internet radio access station according to another embodiment of the present invention; and FIG. 12 is a block diagram showing a method of controlling a plurality of management processors of a portable internet radio access station according to an embodiment of the present invention.

BEST MODE FOR CARRYING OUT THE INVENTION

Figure 1:
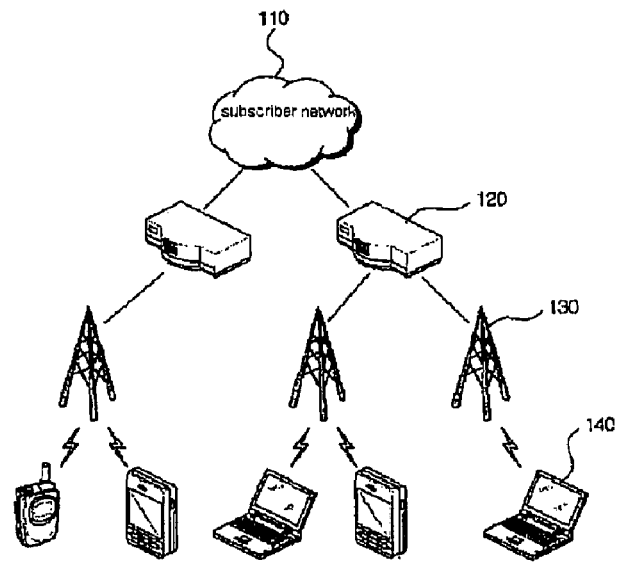
FIG. 1 is a schematic view showing a portable internet network of the related art.
Figure 2:
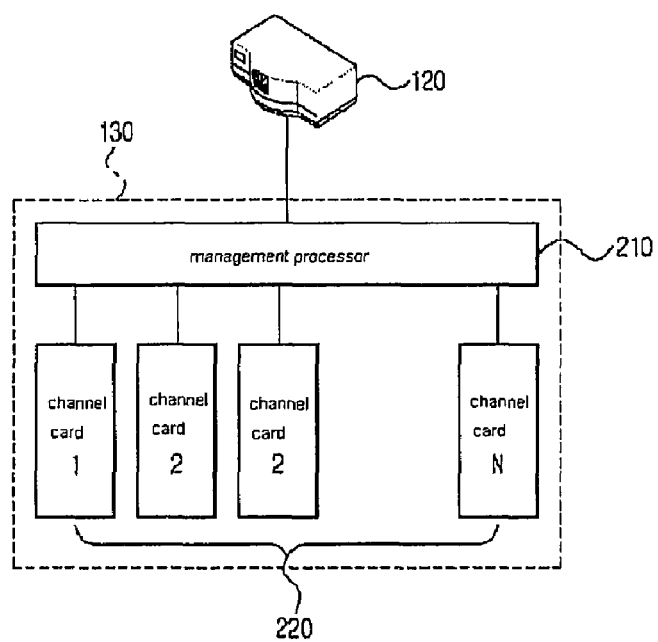
FIG. 2 is a block diagram showing an inner structure of a radio access station of the related art.

Reference will now be made in detail to the preferred embodiments of the invention, examples of which are illustrated in the accompanying drawings.

FIG. 3 is a block diagram showing an inner structure of a management processor in a portable internet radio access station according to an embodiment of the present invention.

In an embodiment of the present invention, a portable internet radio access station includes a plurality of management processors and a continuity of call processing is secured by operating the plurality of management processors coupled with one another.

Accordingly, a portable internet radio access station according (RAS) to an embodiment of the present invention includes a plurality of management processors each having an inner structure shown in FIG. 3. Although a portable internet radio access station including first and second management processors will be illustrated hereinafter as an exemplary embodiment, the number of management processors is not limited to two.

As shown in FIG. 3, each management processor 300 includes an obstruction sensing unit 310, an operation state determining unit 320, a database synchronizing unit 340 and a call processing database 330. The obstruction sensing unit 310 senses a generation of obstructions in the first or second management processor, a restoration of the first or second management processor 300 from the obstructions, or a maintenance of the obstructions in the first or second management processor. Accordingly, the obstruction sensing unit 310 in each management processor 300 may sense the obstructions relating to all or a portion of the plurality of management processors in the portable internet RAS.

The obstruction sensing unit 310 may sense the obstructions of each management processor 300 through a hardware interrupt method. For example, the first and second management processors 300 may be formed on a single back board and connected to each other. Accordingly, when an operation state of one management processor is changed due to a generation of obstructions or a restoration from the obstructions, a hardware interrupt is generated at the same time and the obstruction sensing unit 310 of each management processor 300 can sense the change in the operation state of the first and second management processors 300.

Since the changes of the operation states of the first and second management processors 300 are totally sensed by the hardware interrupt method, hardware and software structures of the obstruction sensing unit 310 is simplified and a delay for sensing the obstructions is minimized.

The obstruction sensing unit 310 can sense diverse obstructions in the first and second management processors 300. Although the obstruction sensing unit 310 is formed in each management processor 300 in the embodiment of the present invention, the obstruction sensing unit may be formed outside the first and second management processors in another embodiment. In addition, the obstruction sensing unit may sense at least one of an obstruction in supply of power, an obstruction in operation of network, an obstruction in an operation of hardware and an obstruction in operation of software generated in each management processor 300.

Specifically, the network obstruction may include a traffic overload in the management processor 300 of the RAS as well as an abnormality in a network apparatus. Similarly, the power supply obstruction may include a temporary obstruction in each management processor 300 due to excess or deficiency in supply of power and relating to management of available power as well as an obstruction in a power supply apparatus.

Accordingly, the obstruction sensed by the obstruction sensing unit 310 may include all kinds of obstructions that affect the operation of call processing in the management processor 300 and interfere with the continuity of call processing.

Referring again to FIG. 3, the call processing database 330 stores a call processing information relating to the call processing. Accordingly, the call processing database 3 30 stores the call processing information relating to the RAS, the portable subscriber station (PSS) and the other network elements necessary for processing of call connection request from the portable subscriber station and continuity of call processing.

Further, the call processing database 330 may store the information renewed through the procedure of call processing as the call processing information. As a result, the call processing database 330 statically stores the call processing information before start of call processing, and dynamically extracts or stores the information changed or renewed through the call processing.

In the embodiment of the present invention, the call processing information stored in the call processing database 330 may include at least one of a media access control (MAC) address relating to the radio access station or the portable subscriber station, an internet protocol (IP) address, a wireless channel information and a cell identifier, which are basic information for providing a portable internet service and a call connect thereof.

In addition, the call processing database 330 may store a log information used for preparation, start and maintenance of call processing and necessary for simplifying the repeated procedure of the call processing and an event information generated in the management processor 300 performing the call processing.

Referring again to FIG. 3, the operation state determining unit 320 determines an operation state of each management processor 300 based on the obstruction of the first or second management processor 300 sensed by the obstruction sensing unit 310.

In the embodiment of the present invention, each management processor 300 in the portable internet RAS may transit among finite operation states and include a finite state machine where an inherent operation is defined for the respective operation state.

FIG. 4 is a schematic view showing operation states and a state transition among the operation states of a management processor in a portable internet RAS according to an embodiment of the present invention.

As shown in FIG. 4, the management processor 300 may include a finite state machine having a plurality of operation states different from one another. The plurality of operation states are determined according to the obstruction of the first or second management processor 300 in the RAS.

When the first and second management processors 300 operate without any obstruction, one management processor substantially controlling the call processing, for example, the first management processor has an active state 420 where the call processing is directly controlled using available resources.

While the first management processor has the active state 420, the second management processor has an auxiliary active state 430 where the call processing is not substantially controlled even though all the resources for the call processing are available.

When an obstruction occurs in one of the first and second management processors 300 having the active and auxiliary active states 420 and 430, respectively, the operation states of the first and second management processors 300 are changed.

For example, when the obstruction occurs in the first management processor, the first management processor may have an inactive state 410. In the inactive state 410, the call processing and the update of a database accompanied with the call processing are not performed.

While the first management processor has the inactive state 410, the second management processor may have a single active state 440. As a result, when an obstruction occurs in one of the first and second management processors and the other one of the first and second management processors operates without an obstruction, the management processor having the obstruction operates in the inactive state 410 and the other management processor without the obstruction operates in the single active state 440.

The management processor 300 in the single active state 440 singly performs the call processing and the update of the database corresponding to the call processing. Accordingly, the management processor 300 performs the call processing and the update without an interchange of information regarding the call processing with the other management processor.

As shown in FIG. 4, all the operation states may be transited to the inactive state 410 and the single active state 440. Accordingly, when one of the first and second management processors has an obstruction, the management processor having the obstruction transits to the inactive state 410 and the other management processor having no obstruction transits to the single active state 440 regardless of the previous operation states.

However, there exists a limitation in an operation state transition to the active state 420 and the auxiliary active state 430. As shown in FIG. 4, the active state 420 is transited only from the single active state 440, and the auxiliary active state 430 is transited only from the inactive state 410. When one of the first and second management processors has an obstruction, if the management processor having the obstruction is restored, the inactive state 410 of the corresponding management processor is transited to the auxiliary active state 430 where the call processing is not substantially controlled. In addition, the single active state 440 of the other management processor that controls the call processing is transited to the active state 420.

As a result, the first and second management processors 300 operate in the corresponding operation states and the operation state determining unit 320 determines the operation states of the first and second management processors 300 based on the obstruction. Accordingly, the obstruction sensing unit 310 senses not only the obstruction in the management processor including the obstruction sensing unit 310 but also the obstruction in the other management processor.

In the embodiment of the present invention, each management processor has a finite state machine operating in one of an inactive state 410, an active state 420, an auxiliary active state 430 and a single active state 440. In another embodiment, each management processor may operate in operation states having substantially the same method, the same function and the same effect as the above four operation states.

MODE FOR THE INVENTION

FIG. 5 is a schematic view showing operation states and a state transition among the operation states of a management processor in a portable internet RAS according to another embodiment of the present invention. The operation states of FIG. 5 further includes a waiting state 510 that is a preparation state. When a power is supplied to each management processor or when the operation state is transited from an inactive state 410 to the other state, each management processor has the waiting state 510. In the waiting state 510, the management processor physically completely operates, but the call processing is not controlled because application is not provided.

Accordingly, the inactive state 410 of each management processor is transited to the other operation state through the waiting state 510. While the inactive state 410 is transited to the auxiliary active state 430 or the single active state 440 in FIG. 4, the inactive state 410 is transited to the auxiliary active state 430 or the single active state 440 through the waiting state 510 in FIG. 5.

In addition, the inactive state 410 may be transited to the active state 420 through the waiting state 510. For example, both of the first and second management processors may have the inactive state 410 when the obstruction occurs or before the call processing begins to be controlled. Next, one of the first and second management processors may be restored from the obstruction or a power may be supplied to one of the first and second management processors, thereby the management processor having the waiting state 510. Successively, the other one of the first and second management processors may be restored or a power may be supplied to the other one of the first and second management processors, the other management processor also having the waiting state 510. Next, one of the first and second management processors has the active state 420 and the other one of the first and second management processors has the auxiliary active state 430 according to a predetermined rule.

In each operation state of FIGS. 4 and 5, the database synchronizing unit 340 performs its inherent operation. Accordingly, the database synchronizing unit 340 synchronizes the call processing data bases 330 of the first and second management processors according to the operation states of the first and second management processors.

The database synchronization includes a series of operations for accord information stored in two different apparatus. For example, the database synchronization may include operations of a replication, a dump, an update and a marking. The replication is an operation to mutually duplicate information between the databases, and the dump is an operation to duplicate a bundle of information in one database and record the bundle of information to the other database. The update is an operation to renew one database using the information duplicated from the other database, and the marking is an operation to add an identifier to the information of one database different from that of the other database for performing operations such as the dump afterwards.

The database synchronizing unit 340 secures a continuity of call processing by according the information in the plurality of management processors 300 even when one management processor has an obstruction and the other management processor controls the call processing. In addition, a reliability of a portable internet service is improved due to the database synchronization especially when the portable internet service should be provided in real time. In the portable internet service of real time, the continuity of call processing is directly connected to the reliability.

The operation of the database synchronizing unit 340 for the operation states of the plurality of management processors 300 will be illustrated hereinafter.

When the first management processor has the active state 420 and the second management processor has the auxiliary active state 430, the first management processor controls the call processing although both of the first and second management processors operate normally without obstruction. The database synchronizing unit 340 of the first management processor performs the database synchronization by continuously replicating the call processing information in the call processing database 330 of the first management processor and sending the replicated call processing information to the call processing database of the second management processor.

Further, the database synchronizing unit of the second management processor in the auxiliary active state 430 performs the database synchronization by receiving and storing the replicated call processing information in the call processing database of the second management processor.

While both of the first and second management processors operate without obstruction, the databases of the first and second management processors are easily synchronized. Accordingly, the call processing information updated in the call processing database 330 of the first management processor in the active state 420 or the event information relating to the first management processor is successively replicated and recorded in the call processing database of the second management processor, thereby the information stored in the call processing databases of the first and second management processors synchronized.

However, when one of the first and second management processors has the inactive state 410 due to the obstruction, an additional processing is required for the database synchronization because the replication and the storage of the call processing information is impossible in the call processing database of the management processor in the inactive state 410. For example, when the first management processor has the single active state 440 and the second management processor has the inactive state 410 due to the obstruction in the second management processor, the database synchronizing unit 340 of the first management processor in the single active state 440 performs the marking to the call processing information stored in the call processing database 330 posterior to a generation time of the obstruction for restoration of the second management processor. In addition, the marking may be performed to the call processing information stored in the call processing database 330 before the generation time of the obstruction.

The continuity of the call processing is secured by the marking to the call processing database even when the database of the management processor is lost due to the obstruction or the previous operation states before the generation time of the obstruction are not known.

When the obstruction sensing unit 310 of the first management processor senses the restoration of the second management processor in the inactive state 410, the first management processor performs the dump of a bundle of call processing marked and stored in the first management processor to the database of the second management processor, thereby the second management processor performing the database synchronization.

The marking may be performed by adding independent identifiers to the previous call processing information before the generation time of the obstruction and the next call processing information newly stored between the generation time of the obstruction and the restoration time from the obstruction. In addition, the database synchronizing unit 340 may include an additional memory means for the next call processing information stored after the generation time of the obstruction and a generation time information for discriminating the previous and next call processing information may be stored in the additional memory means. The additional memory means may have a dynamic or variable structure for easier management of the memory means.

FIGS. 6 and 7 are schematic views showing operations of call processing databases of a plurality of management processors in a portable internet RAS according to an embodiment of the present invention. FIG. 6 shows the call processing databases when an obstruction occurs in one management processor, and FIG. 7 shows the call processing databases after the management processor is restored from the obstruction.

As shown in FIG. 6, while the first and second management processors initially operate in the active and auxiliary active states 420 and 430, respectively, the call processing information in an active data region 611 of the call processing database 610 of the first management processor is replicated and stored (601) in an auxiliary active data region 621 of the call processing database 620 of the second management processor.

When the obstruction occurs in the second management processor, the first and second management processors have the single active and inactive states 440 and 410, respectively. The first management processor continues to control the call processing and performs the marking. In addition, the first management processor stores an updated call processing information or an event information in a single active data region 612 of the call processing database 610 with marking.

The marking is performed for the call processing information updated in the call processing database 610 till the second management processor is restored from the obstruction, i.e., while the first and second management processors have the single active and inactive states 440 and 410, respectively.

As shown in FIG. 7, when the second management processor is restored from the obstruction, the obstruction sensing unit 310 of the first management processor senses the restoration and the call processing information in the single active region 612 with marking is replicated (701) to the restored second management processor. The database synchronizing unit 340 of the second management processor receives the call processing information replicated in the first management processor and stores the call processing information in an inactive data region 722 of the call processing database 620.

At the same time, the single active state 440 of the first management processor is transited to the active state 420, and the inactive state 410 of the second management processor is transited to the auxiliary active state 430. After this state transition time, the call processing information in an active data region 713 of the call processing database 610 of the first management processor is replicated and stored (702) in an auxiliary active data region 723 of the call processing database 620 of the second management processor as before the occurrence of the obstruction.

The embodiment of FIGS. 6 and 7 may be applied to a case where the first and second management processors initially have the auxiliary active and active states 430 and 420, and the first management processor has an obstruction and then is restored.

FIGS. 8 and 9 are schematic views showing operations of call processing databases of a plurality of management processors in a portable internet RAS according to another embodiment of the present invention. FIG. 8 shows the call processing databases when an obstruction occurs in one management processor, and FIG. 9 shows the call processing databases after the management processor is restored from the obstruction.

Differently from FIGS. 6 and 7, the first and second management processors initially have the auxiliary active and active 430 and 420, respectively in FIGS. 8 and 9.

As shown in FIG. 8, the call processing information in an active data region 821 of the call processing database 820 of the second management processor is replicated and stored (801) in an auxiliary active data region 811 of the call processing database 810 of the first management processor.

When the obstruction occurs in the second management processor, the auxiliary state 430 of the first management processor is transited to the single active state 440, and the active state 420 of the second management state is transited to the inactive states 410. Since the call processing information updated in the call processing database 820 of the second management processor is successively renewed in the call processing database 810 of the first management processor during the auxiliary active state 430, the call processing databases 810 and 820 are synchronized. Accordingly, a continuity in call processing is obtained even when the auxiliary active state that is substantially a preliminary state for controlling the call processing is directly transited to the single active state that is an independent state for controlling the call processing.

As a result, reliability and continuity in the call processing are obtained by pliably treating an obstruction in the portable internet RAS according to the present invention.

When the first and second management processors have the single active and inactive states 440 and 410, respectively, the marking of the call processing database 810 is performed similar to that of FIG. 6.

As shown in FIG. 9, when the second management processor is restored from the obstruction, the obstruction sensing unit 310 of the first management processor senses the restoration and the call processing information in the single active region 812 with marking is replicated (901) to the restored second management processor. The database synchronizing unit 340 of the second management processor receives the call processing information replicated in the first management processor and stores the call processing information in an inactive data region 922 of the call processing database 820.

After the second management processor is restored from the obstruction, the replication and the storage of the call processing databases 810 and 820 are performed similar to those of FIG. 7.

The embodiment of FIGS. 8 and 9 may be applied to a case where the first and second management processors initially have the active and auxiliary active states 420 and 430, and the first management processor has an obstruction and then is restored.

In the above-illustration, the first and second management processors for the call processing in the portable internet RAS are not limited to specific ones among the plurality of management processors. Accordingly, first and second management processors may be substituted with each other in another embodiment of the present invention.

In addition, the operation states of the plurality of management processors may be determined based on the operation of the portable internet RAS. For example, in the embodiment where the first and second management processors initially have the active and auxiliary active states 420 and 430, respectively, the first and second management processors may be interpreted to operate in the active and auxiliary active states 420 and 430, respectively, before the obstruction occurs.

FIG. 10 is a view showing operation states of a plurality of management processors of a portable internet RAS according to an embodiment of the present invention. FIG. 10 shows sequential operation states of first and second management processors after a power is supplied.

In a first step 1010 of FIG. 10, each of the first and second management processors has the inactive or waiting state 410 or 510 after the first and second management processors start to be booted by supplying a power.

In a second step 1020 of FIG. 10, the operation states of the first and second management processors are transited to the active and auxiliary active states 420 and 430, respectively, according to a predetermined rule. In addition, the call processing information in the call processing database of the first management processor is replicated to the second management processor.

For example, the predetermined rule may be a master/slave relation such that the first management processor operates in the active state 420 when both of the first and second management processors initially have the waiting state 510. Alternatively, the predetermined rule may be a relation such that a management processor first in the waiting state 510 operates in the active state 420 when both of the first and second management processors initially have the waiting state 510.

In a third step 1030 of FIG. 10, when an obstruction is sensed in the second management processor in the auxiliary active state 430, the auxiliary active state 430 of the second management processor is transited to the inactive state 410 and the active state 420 of the first management processor is transited to the single active state 440. Further, independent identifiers may be added to the call processing information prior to and posterior to the obstruction and an event information as the marking.

In a fourth step 1040 of FIG. 10, when the restoration of the second management processor is sensed, the call processing information and the event information with the marking are dumped to the call processing database of the second management processor. At the same time, the first and second management processors have the active and auxiliary active states 420 and 430, respectively, similar to those in the second step 1020.

FIG. 11 is a view showing operation states of a plurality of management processors of a portable internet RAS according to another embodiment of the present invention. FIG. 11 shows sequential operation states of first and second management processors after a power is supplied.

In a first step 1110 of FIG. 11, each of the first and second management processors has the inactive or waiting state 410 or 510 after the first and second management processors start to be booted by supplying a power.

In a second step 1120 of FIG. 11, the operation states of the first and second management processors are transited to the auxiliary active and active states 430 and 420, respectively, according to a predetermined rule. In addition, the call processing information in the call processing database of the second management processor is replicated to the first management processor.

In a third step 1130 of FIG. 11, when an obstruction is sensed in the second management processor in the active state 420, the active state 420 of the second management processor is transited to the inactive state 410 and the auxiliary active state 430 of the first management processor is transited to the single active state 440.

While the auxiliary active state 430 of the first management processor is transited to the single active state 440, the call processing database of the first management processor may be activated. The activation of the call processing database may include an operational preparation of the call processing database for substantially controlling the call processing and a connection to the access control router (ACR) for controlling the call processing.

Although the first management processor in the auxiliary active state 430 does not directly control the call processing before the obstruction occurs, the first and second management processors are synchronized. Accordingly, the first management processor controls the call processing successively to the second management processor when the second management processor can not control the call processing any more. As a result, a continuity and a reliability in the call processing are secured even when an obstruction occurs in the management processor controlling the call processing.

Since the marking of the first management processor in the third step 1130 is similar to that of FIG. 10, illustrations may be omitted.

In a fourth step 1140 of FIG. 11, after the second management processor is restored from the obstruction, and the first and second management processors have the auxiliary active and active states 430 and 420, respectively. For example, the operation of the first and second management processors may be determined by the operation states of the first and second management processors posterior to the obstruction regardless of the operation states prior to the obstruction.

In another embodiment of the present invention, a power may be supplied to each of the plurality of management processors 300 in the portable internet RAS. The obstruction occurring in one of the plurality of management processors may include a power supply obstruction. To obtain a continuity in the call processing even when an obstruction occurs in one of the plurality of management processors, it is required to supply a power to the other ones of the plurality of management processors. Accordingly, a power may be independently supplied to each of the plurality of management processors for securing the continuity in the call processing.

Similarly, each of the plurality of management processors may independently include software, hardware and network resources without common usage. Since each of the plurality of management processors operates independently, the other ones of the plurality of management processors may operate to secure the continuity in the call processing even when one of the plurality of management processors has obstructions in the software, hardware and the network resources.

The portable internet RAS 130 may provide a multiplex of a call itself as well as a multiplex of a call resource. Accordingly, the database synchronizing unit does not only perform a synchronization after an initial connection to the PSS is set up (multiplex of call resource) but also performs a synchronization while the initial connection to the PSS is set up (duplex of call). As a result, a continuity of the call processing is secured in the portable internet RAS 130 while the call connection for providing the portable internet service is being set up as well as while the portable internet service is provided using the call such that the connection has been set up.

FIG. 12 is a block diagram showing a method of controlling a plurality of management processors of a portable internet RAS according to an embodiment of the present invention.

In a first step S1210 of FIG. 12, obstructions in the first or second management processor are sensed. Accordingly, occurrence of the obstruction, restoration from the obstruction and maintenance of the obstruction in each of the plurality of management processors 300 are sensed. The sensing of the obstruction may be performed through a hardware interrupt method as illustrated in FIG. 3. When the obstruction is sensed in the second management processor, the first management processor singly performs the call processing.

In a second step S1220 of FIG. 12, the stored and updated call processing information in the first management processor is marked by an independent identifier.

In a third step S1230 of FIG. 12, when no obstruction is sensed in the first and second management processors, the call processing information stored in the first management processor that is substantially controlling the call processing is successively replicated and stored to the call processing database of the second management processor. The call processing information updated in the management processor that is substantially controlling the call processing is immediately transmitted to the other management processor when the two management processors have an operation state capable of controlling the call processing. Accordingly, the call processing databases of the plurality of management processors are synchronized.

In a fourth step S1240 of FIG. 12, when a restoration of the second management processor from the obstruction is sensed, a bundle of the call processing information marked and stored in the call processing database of the first management processor is dumped to the call processing database of the second management processor. The database synchronization may be obtained by marking and dumping the call processing information in the databases against the temporary obstruction.

In another embodiment of the present invention, a method of controlling a plurality of management processors for a call processing includes: initializing first and second management processors of the plurality of management processors as active and auxiliary active states 420 and 430, respectively; sensing an obstruction of the first and second management processors; and transiting an active state 420 of the first management processor to an inactive state 410 and transiting an auxiliary active state 430 of the second management processor to a single active state 440 when the obstruction of the first management processor is sensed, and transiting the active state 420 of the first management processor to the single active state 440 and transiting the auxiliary active state 430 of the second management processor to the inactive state 410 when the obstruction of the second management processor is sensed.

When the obstruction of the first management processor is sensed, the auxiliary active state 430 of the second management processor is transited to the single active state 440, and the second management processor singly performs the call processing in the portable internet RAS. In addition, the second management processor performs the database synchronization by replicating the call processing information in the call processing database of the first management processor prior to the obstruction to the call processing database of the second management processor.

Accordingly, although the call processing database of the second management processor is inactive for controlling the call processing, the call processing database of the second management processor has the same call processing information as the call processing database of the first management processor that has substantially controlled the call processing. As a result, the second management processor activates the call processing information stored in the second management processor to control the call processing instead of the first management processor. The activation of call processing database may include an operational preparation of the call processing database for substantially controlling the call processing and a connection to the ACR for controlling the call processing.

The second management processor in the single active state 440 performs the marking to the call processing information stored in the second management processor prior to the obstruction and the call processing information updated posterior to the obstruction.

When the first management processor is restored from the obstruction, the second management processor performs the database synchronization by dumping the call processing information with the marking to the call processing database of the first management processor. During the dumping, the second management processor continues to control the call processing.

When the first management processor is restored and has a waiting state for normally controlling the call processing, the inactive state 410 of the first management processor is transited to the auxiliary active state 430 and the single active state 440 of the second management processor is transited to the active state 420.

In another embodiment of the present invention, when an obstruction is sensed in the second management processor, the active state 420 of the first management processor is transited to the single active state 440, and the auxiliary active state 430 of the second management processor is transited to the inactive state 410.

The first management processor in the single active state 440 performs the marking to the call processing information stored in the first management processor prior to the obstruction and the call processing information updated posterior to the obstruction.

When the second management processor is restored from the obstruction, the first management processor performs the database synchronization by dumping the call processing information with the marking to the call processing database of the second management processor.

When the second management processor is restored, the single active state 440 of the first management processor is transited to the active state 420, and the inactive state 410 of the second management processor is transited to the auxiliary active state 430. The first management processor does not perform the marking to the call processing information after the restoration time. If the obstruction occurs again, the marking may be repeated.

The above embodiments of the present invention where the first and second management processors initially operate in the active and auxiliary active states 420 and 430, respectively, may be applied to another embodiments where the first and second management processors initially operate in the auxiliary and active states 430 and 420, respectively.

Accordingly, the first and second management processors may be substituted with each other so that the first and second management processors can be initialized in the auxiliary and active states 430 and 420, respectively.

The description regarding FIGS. 3 to 11 may be applied to FIG. 12.

A method of controlling a plurality of management processors for a call processing in a portable internet RAS according to the present invention may be recorded in a computer decodable medium as a program order form that can be performed through various computer means. One or a combination of a program order, a data file and a data structure may be recorded in the computer decodable medium. The program order form may be specially designed for the present invention or a software of the related art may be used as the program order form.

The computer decodable medium may include a hard disk, a floppy disk, magnetic media such as a magnetic tape, optical media such as CD-ROM (compact disk read only memory) and DVD (digital versatile disk), magneto optical media such as a floptical disk and a hardware apparatus such as ROM (read only memory), RAM (random access memory) and flash memory designed for storing and performing a program order. In addition, the computer decodable medium may include a transmission medium where a carrier wave transferring a signal corresponding to a program order and a data structure is transmitted. For example, the transmission medium may include a light, a metal line and a wave guide.

The program order may include a machine language code formed by a compiler and a high level language performed in a computer using an interpreter. The hardware apparatus may operate with at least one software module for performing the present invention.

It will be apparent to those skilled in the art that various modifications and variations can be made in the portable internet radio access station including a plurality of management processors and the method of controlling the plurality of management processors of embodiments of the invention without departing from the spirit or scope of the invention. Thus, it is intended that embodiments of the invention cover the modifications and variations of this invention provided they come within the scope of the appended claims and their equivalents.

INDUSTRIAL APPLICABILITY

A portable internet RAS includes a plurality of management processors and databases of the management processors are connected to one another. As a result, continuity and stability of call processing are secured in the portable internet RAS.

In another aspect, a portable internet radio access station controls call processing using a plurality of management processors whose operation states are determined based on an obstruction. As a result, continuity of call processing even when an obstruction occurs.

In another aspect, a portable internet RAS continuously replicates updated call processing information when all of a plurality of management processors operate without obstructions. As a result, call processing databases of the plurality of management processors are synchronized with one another.

In another aspect, a portable internet radio access station marks a call processing information when one of a plurality of management processors has an obstruction and dumps a bundle of the marked call processing information when the management processor is restored from the obstruction. As a result, call processing databases are effectively synchronized.

In another aspect, a portable internet RAS determines operation states of each management processor based on an obstruction. As a result, an organic state transition among the operation states is obtained and the portable internet RAS operate more effectively.

In another aspect, a portable internet RAS senses an obstruction based on a hardware interrupt method. As a result, hardware and software structures of an obstruction sensing unit are simplified and delay for sensing the obstruction or a restoration from the obstruction is minimized.

In another aspect, a portable internet RAS divides source powers applied to a plurality of management processors or hardware and software structures of the plurality of management processors to be independent. As a result, an obstruction occurring in one management processor does not affect the other management processor and a solving capability against obstructions of the portable internet RAS is improved.

In another aspect, a portable internet RAS synchronizes databases of a plurality of management processors while a PSS is connected to the portable internet RAS or while a portable internet service is provided to the PSS. As a result, the portable internet RAS provides multiplexing of calls and call resources.

The invention claimed is:

1. A portable internet radio access station (RAS) including a plurality of management processors, comprising:
   a first management processor; and
   a second management processor,
   wherein the first management processor comprising:
   an obstruction sensing unit sensing an obstruction in the first and second management processors;
   a call processing database storing a call processing information of the RAS;
   an operation state determining unit determining an operation state of the first management processor based on the obstruction; and
   a database synchronizing unit synchronizing the call processing database with a call processing database of the second management processor based on the operation state of the first management processor.

2. The portable internet RAS according to claim 1, wherein when the obstruction sensing unit senses no obstruction in the first and second management processors,
   in case that the first management processor controls the call processing, the operation state determining unit determines the operation state of the first management processor as an active state, and
   while the first management processor operates in the active state, the database synchronizing unit replicates the call processing information that is stored in the call processing database to the call processing database of the second management processor.

3. The portable internet RAS according to claim 1, wherein when the obstruction sensing unit senses no obstruction in the first and second management processors,
   in case that the first management processor does not control the call processing, the operation state determining unit determines the operation state of the first management processor as an auxiliary active state, and
   while the first management processor operates in the auxiliary active state, the database synchronizing unit receives a second call processing information from the second management processor and stores the second call processing information in the call processing database.

4. The portable internet RAS according to claim 1, wherein when the obstruction sensing unit senses the obstruction in the second management processor, the operation state determining unit determines the operation state of the first management processor as a single active state, and while the first management processor operates in the single active state, the database synchronizing unit marks at least one of the call processing information that is stored in the call processing database and the call processing information that is stored in the call processing database prior to the obstruction.

5. The portable internet RAS according to claim 4, wherein the obstruction sensing unit senses a restoration of the second management processor from the obstruction, and the database synchronizing unit dumps the marked call processing information to the second management processor in response to the restoration.

6. The portable internet RAS according to claim 1, wherein the database synchronizing unit synchronizes the call processing database with the call processing database of the second management processor while an initial connection to a portable subscriber station (PSS) is set up.

7. The portable internet RAS according to claim 1, wherein the database synchronizing unit synchronizes the call processing database with the call processing database of the second management processor while a portable internet service is provided after an initial connection to a portable subscriber station is set up.

8. A portable internet radio access station (RAS) including a plurality of management processors, comprising:
first and second management processors operating coupled with each other; and
an operation state determining unit determining an operation state of the first and second management processors based on an obstruction in the first and second management processors,
wherein the plurality of management processors includes the first and second management processors,
wherein the first management processor comprising:
a first call processing database storing a call processing information of the portable internet RAS; and
a first database synchronizing unit synchronizing the first call processing database with a second call processing database based on the operation state, and
wherein the second management processor comprising:
the second call processing database storing the call processing information of the portable internet RAS; and
a second database synchronizing unit synchronizing the second call processing database with the first call processing database based on the operation state.

9. The portable internet RAS according to claim 8, wherein at least one of the RAS and the plurality of management processors includes an obstruction sensing unit sensing an obstruction in the first and second management processors.

10. The portable internet RAS according to claim 8, wherein when no obstruction is sensed in the first and second management processors, the first database synchronizing unit replicates the call processing information that is stored in the first call processing database to the second call processing database.

11. The portable internet RAS according to claim 8, wherein when no obstruction is sensed in the first and second management processors, the second database synchronizing unit receives the call processing information from the first management processor and stores the received call processing information in the second call processing database.

12. The portable internet RAS according to claim 8, wherein when an obstruction is sensed in the second management processor, the first database synchronizing unit marks at least one of the call processing information that is stored in the first call processing database and the call processing information that is stored in the first call processing database prior to the obstruction.

13. The portable internet RAS according to claim 12, wherein when a restoration of the second management processor from the obstruction is sensed, the first database synchronizing unit dumps the marked call processing information to the second management processor in response to the restoration.

14. The portable internet RAS according to claim 8, wherein when an obstruction is sensed in the first management processor, the second database synchronizing unit marks at least one of the call processing information that is stored in the second call processing database and the call processing information that is stored in the second call processing database prior to the obstruction.

15. The portable internet RAS according to claim 14, wherein when a restoration of the first management processor from the obstruction is sensed, the second database synchronizing unit dumps the marked call processing information to the first management processor in response to the restoration.

16. A portable internet radio access station (RAS) comprising a plurality of management processors,
wherein the plurality of management processors includes the first and second management processors,
wherein the first management processor is initialized in an active state and the second management processor is initialized an auxiliary active state,
wherein when an obstruction is sensed in the first management processor, the first management processor is transited from the active state to an inactive state and the second management processor is transited from the auxiliary active state to a single active state, and
wherein when the obstruction is sensed in the second management processor, the first management processor is transited from the active state to the single active state and the second management processor is transited from the auxiliary active state to the inactive state.

17. The portable internet RAS according to claim 16, wherein when the first management processor is restored from the obstruction, the first management processor is transited from the inactive state to the auxiliary active state and the second management processor is transited from the single active state to the active state.

18. The portable internet RAS according to claim 16, wherein when the second management processor is restored from the obstruction, the first management processor is transited from the single active state to the active state and the second management processor is transited from the inactive state to the auxiliary active state.

19. The portable internet RAS according to claim 16, wherein the plurality of management processors include an operation state determining unit determining an operation state of the first and second management processors based on the obstruction.

20. The portable internet RAS according to claim 16, wherein the first management processor includes a first operation state determining unit determining an operation state of the first management processor based on the obstruction, and the second management processor includes a second operation state determining unit determining the operation state of the second management processor based on the obstruction.

21. The portable internet RAS according to claim 16, wherein the first management processor comprises:
a first call processing database storing a call processing information of the portable internet RAS; and a first database synchronizing unit synchronizing the first call processing database with a call processing database of the second management processor based on an operation state of the first management processor, and wherein when the obstruction is sensed in the second management processor and the first management processor is transited from the active state to the single active state, the first database synchronizing unit marks at least one of the call processing information that is stored in the first call processing database prior to the obstruction and the call processing information that is stored in the first call processing database prior to the obstruction and after the second management processor is restored to be transited to the auxiliary active state.

22. The portable internet RAS according to claim 16, wherein the first management processor comprises:

a first call processing database storing a call processing information of the portable internet RAS; and a first database synchronizing unit synchronizing the first call processing database with a call processing database of the second management processor based on an operation state of the first management processor, and wherein when the second management processor is restored from the obstruction and transited from the inactive state to the auxiliary active state, the first database synchronizing unit dumps at least one of the call processing information that is stored in the first call processing database prior to the obstruction and the call processing information that is stored in the first call processing database posterior to the obstruction and before the second management processor is restored to be transited to the auxiliary active state to the call processing database of the second management processor.

23. The portable internet RAS according to claim 16, wherein the second management processor comprises:

a second call processing database storing a call processing information of the portable internet RAS; and a second database synchronizing unit synchronizing the second call processing database with a call processing database of the first management processor based on an operation state of the second management processor, and wherein when the obstruction is sensed in the first management processor and the second management processor is transited from the auxiliary active state to the single active state, the second database synchronizing unit marks at least one of the call processing information that is stored in the second call processing database prior to the obstruction and the call processing information that is stored in the second call processing database posterior to the obstruction and before the first management processor is restored to be transited to the auxiliary active state.

24. The portable internet RAS according to claim 16, wherein the second management processor comprises:

a second call processing database storing a call processing information of the portable internet RAS; and a second database synchronizing unit synchronizing the second call processing database with a call processing database of the first management processor based on an operation state of the second management processor, and wherein when the first management processor is restored from the obstruction and transited from the inactive state to the auxiliary active state, the second database synchronizing unit dumps at least one of the call processing information that is stored in the second call processing database prior to the obstruction and the call processing information that is stored in the second call processing database posterior to the obstruction and before the first management processor is restored to be transited to the auxiliary active state to the call processing database of the first management processor.

25. The portable internet RAS according to claim 16, wherein the first management processor comprises:

a first call processing database storing a call processing information of the portable internet RAS; and a first database synchronizing unit synchronizing the first call processing database with a call processing database of the second management processor based on an operation state of the first management processor, and wherein when no obstruction is sensed in the first and second management processors, the first database synchronizing unit stores the call processing information in the first call processing database and replicates the call processing information to the call processing database of the second management processor.

26. A method of controlling first and second management processors of a portable internet radio access station (RAS), comprising:

sensing an obstruction in the first and second management processors;

when the obstruction is sensed in one of the first and second management processors, marking a call processing information relating to the other one of the first and second management processors; and when the one is restored from the obstruction, dumping the marked call processing information from the one to the other one.

27. The method of controlling first and second management processors according to claim 26, further comprising replicating the call processing information relating to the first management processor to the second management processor while no obstruction is sensed in the first and second management processors.

28. A method of controlling a plurality of management processors including first and second management processors of a portable internet radio access station (RAS), comprising:

(a-1) initializing the first management processor in an active state and the second management processor in an auxiliary active state;

(a-2) sensing an obstruction in the first and second management processors; and (a-3) transiting the first management processor from the active state to an inactive state and transiting the second management processor from the auxiliary active state to a single active state when the obstruction is sensed in the first management processor.

29. The method of controlling a plurality of management processors according to claim 28, wherein when the obstruction is sensed in the first management processor in the step of (a-3), the second management processor singly performs a call processing of the portable internet RAS.

30. The method of controlling a plurality of management processors according to claim 28, wherein when the obstruction is sensed in the first management processor in the step of (a-3), the second management processor activates a call processing information stored in the second management processor.

31. The method of controlling a plurality of management processors according to claim 28, wherein when the obstruction is sensed in the first management processor in the step of (a-3), the second management processor marks at least one of a call processing information stored in the second management processor prior to the obstruction and a call processing information generated posterior to the single active state of the second management processor.

32. The method of controlling a plurality of management processors according to claim 31, further comprising: after the step of (a-3), (a-4)transiting the first management processor from the inactive state to the auxiliary active state and transiting the second management processor from the single active state to the active state when the first management processor is restored from the obstruction; and
    (a-5)dumping the marked call processing information from the second management processor to the first management processor.

33. The method of controlling a plurality of management processors according to claim 28, wherein when the obstruction is sensed in the second management processor in the step of (a-3), the first management processor singly performs a call processing of the portable internet RAS.

34. The method of controlling a plurality of management processors according to claim 28, wherein when the obstruction is sensed in the second management processor in the step of (a-3), transiting the first management processor from the active state to the single active state and transiting the second management processor from the auxiliary active state to the inactive state.

35. The method of controlling a plurality of management processors according to claim 34, further comprising: after the step of (a-3), (a-4)transiting the first management processor from the single active state to the active state and transiting the second management processor from the inactive state to the auxiliary active state when the second management processor is restored from the obstruction; and
    (a-5)dumping the marked call processing information from the first management processor to the second management processor.

36. The method of controlling a plurality of management processors according to claim 28, further comprising: after the step of (a-1),
    performing a call processing of the portable internet RAS in the first management processor; and
    replicating a call processing information of the portable internet access station to the second management processor in the auxiliary active state.

* * * * *